United States Patent [19]

Bouchard et al.

[11] 3,957,127

[45] May 18, 1976

[54] MOTOR VEHICLE STRUCTURE INCLUDING A RESILIENT MOUNT

[75] Inventors: Richard W. Bouchard; Charles G. Mangiaracina, both of Livonia, Mich.

[73] Assignee: Ford Motor Company, Dearborn, Mich.

[22] Filed: Feb. 12, 1975

[21] Appl. No.: 549,248

[52] U.S. Cl. .................................. 180/64 R; 248/9
[51] Int. Cl.² ..................... B60K 5/00; F16F 15/08
[58] Field of Search ................... 180/64 R; 248/8, 9, 248/10

[56] References Cited
UNITED STATES PATENTS

| | | | |
|---|---|---|---|
| 1,731,837 | 10/1929 | Wood | 248/9 |
| 2,081,213 | 5/1937 | Anibal | 180/64 R |
| 2,084,080 | 6/1937 | D'Aubarede | 180/64 R |
| 2,090,223 | 8/1937 | Ney | 180/64 R |
| 2,705,118 | 3/1955 | Beck | 180/64 R |
| 2,903,208 | 9/1959 | Everitt | 248/9 |
| 2,925,974 | 2/1960 | Aebersold et al | 248/9 |
| 3,236,326 | 2/1966 | Reynolds | 180/64 R |

*Primary Examiner*—M. H. Wood, Jr.
*Assistant Examiner*—David M. Mitchell
*Attorney, Agent, or Firm*—John J. Roethel; Keith L. Zerschling

[57] ABSTRACT

Motor vehicle structure including a frame member and the power component separated by one or more resilient mounting assemblies. Each of the mounting assemblies includes an inner cup member telescopingly received in an outer cup member so that the openings of the cup members face in opposite directions. The resilient mounting includes two independent elastomeric members; one which is loaded in compression when an axial force is applied to the mounting assemblies, another which is simultaneously loaded in shear.

4 Claims, 3 Drawing Figures

MOTOR VEHICLE STRUCTURE INCLUDING A RESILIENT MOUNT

BACKGROUND AND SUMMARY OF THE PREFERRED EMBODIMENT

Resilient mounts have long been used for attaching engine, transmission or other powertrain components to the vehicle chassis or frame. Such resilient mounts insulate a portion of the vibrations of the engine or other powertrain components from the vehicle chassis which in turn, decreases the transmission of powertrain vibrations to the vehicle occupants.

The present invention provides motor vehicle structure including a resilient mounting assembly which functions in an axial direction as well as uniformly in all lateral directions. The invention also provides a resilient mounting assembly having two independent elastomeric elements each capable of acting in compression and in shear. The invention further provides a resilient mounting assembly which when one of the elastomeric elements is loaded primarily in compression the other is loaded primarily in shear. The invention also provides a resilient mounting assembly in which metal to metal contact between assembly elements is prevented and which requires only two formed metal parts. Furthermore, the invention provides a resilient mounting structure which may be efficiently and effectively used in pairs. Finally, this invention provides motor vehicle structure including a resilient mounting assembly which may be economically mass produced and which is reliable in service.

Motor vehicle structure in accordance with this invention includes a vehicle frame member, a powertrain component and at least one or more resilient mounting assemblies secured between the frame member and the powertrain component. The resilient mounting assembly includes an inner cup member telescopingly received within an outer cup member. A resilient column is compressed between the base portions of the cup members. A second resilient member comprising an elastomeric annulus is positioned between and bonded to the side wall portions of the inner and outer cup members.

DETAILED DESCRIPTION OF THE PREFERRED EMBODIMENT

Figure 1:
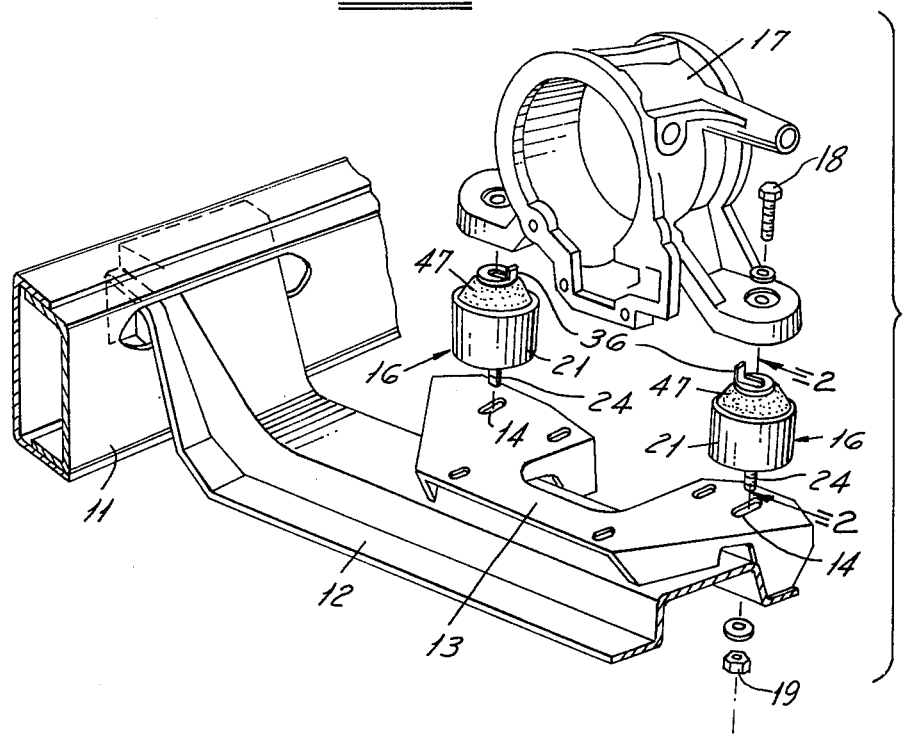
FIG. 1 is a perspective, exploded view of motor vehicle structure constructed in accordance with this invention.

FIG. 1 of the drawings shows a motor vehicle frame side rail 11 and a frame cross member 12 extending between the side rail 11 and a second side rail (not shown) on the other side of the vehicle. Fixed to the cross member is a mounting bracket 13 having openings 14 through which resilient mounting assemblies 16 are bolted. Attached to the upper ends of mounting assemblies 16 is a powertrain component 17 such as the transmission adaptor housing as shown. The powertrain component is secured to the mounting assemblies by cap screws 18 which are threadedly received in the mounting assembly. The mounting assemblies are secured to the bracket 13 by nuts 19 which threadedly engage threaded studs protruding from and affixed to the base of each mounting assembly 16.

Figure 2:
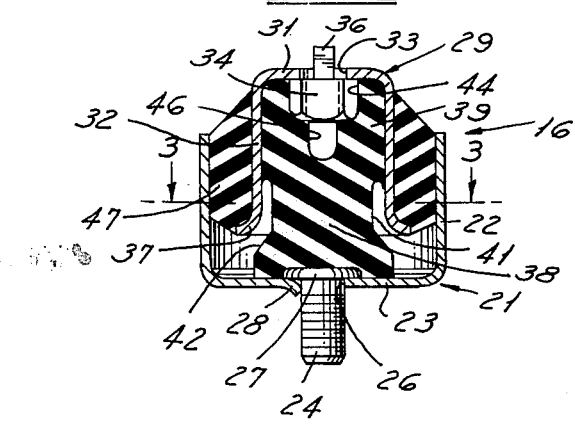
FIG. 2 is an axial cross-sectional view of the resilient mounting assembly taken on plane 2—2 of FIG. 1.
Figure 3:
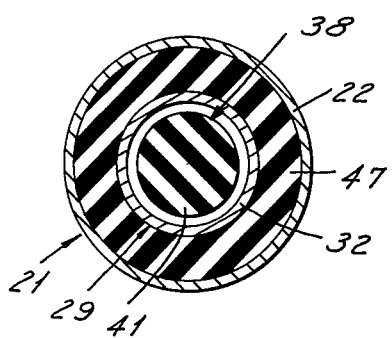
FIG. 3 is a transverse cross-sectional view of the resilient mounting assembly taken along plane 3—3 of FIG. 2.

FIGS. 2 and 3 illustrate in detail the resilient mounting assembly 16. An outer stamped metal cup member 21 includes a cylindrical wall portion 22 and a base portion 23. A stud 24 is received within an opening 26 at the center of the base and protrudes downwardly into one of the openings 14 of bracket 13 where it is secured to the bracket by nut 19. The head 27 of the stud protrudes from the base 23 of the cup. A locator tab 28 is formed at the base of the cup and extends radially downwardly into one of the openings 14 to provide positive positioning of the cup member relative to the bracket. A second inner cup 29 is telescopingly and coaxially received within the first cup 21 and is inverted relative thereto. The inner cup includes a base portion 31 and generally cylindrical wall portions 32. The lower edge 37 of the inner cup is flared radially outwardly as shown in FIG. 2. An opening 33 is formed centrally within the base. A nut 34 is welded to the inner base of the second cup coaxial with the opening 33. A locator tab 36 extends axially upwardly from the base of the cup member to provide positive positioning in a corresponding groove (not shown) in the housing 17.

An elastomeric column 38 is received within the inner cup and is positioned between the base 31 thereof and the base 23 of the outer cup. The free height of the column is about one third greater than the axial height of the second cup to maintain the second cup in an axially spaced relationship from the outer cup. The column includes a first portion 39 of a diameter essentially equal to the inner diameter of the inner cup 32 and a second reduced diameter portion 41 adjacent the flared edge 37 of the inner cup. A third portion of the column protrudes from the cup and includes a generally conical surface 42 increasing in diameter to a maximum diameter greater than the inside diameter of the inner cup. The lower end of the column includes an axial recess 43 corresponding in shape to the head 27 of the stud 24. The head 27 serves to center the base of the column relative to the base of the cup 21. In addition, the base of the column may be bonded to the base of the cup. The opposite end of the elastomeric column includes a void 44 to accommodate the nut 34 and the second void 46 to accommodate the threaded stud when it is threadedly received within the nut 34.

A second elastomeric member 47 having an annular shape is positioned between the inside surface of cylindrical wall 22 and the outer surface of cylindrical wall 32 and is bonded to each of these surfaces. The elastomeric member 47 is radially compressed when installed between the inner and outer cups.

It may be seen that when an axially compressive force is applied to the engine mount 16 the elastomeric column 38 is compressed while the elastomeric annulus 47 is loaded in shear. The inner cup 29 is prevented from bottoming against the base 23 of the outer cup 21 by the conical portion 42 of the elastomeric column 38 which abuts the flared edge 37 of the inner cup when a large axial impact force is experienced. When a lateral force is applied to the engine mount assembly, the elastomeric annulus 47 is loaded in compression while the elastomeric column 38 is loaded in shear. It may also be seen that the engine mount has an identical response irrespective of the direction of the lateral force.

Modifications and alterations will occur to those skilled in the art which are included within the scope of the following claims.

We claim:

1. Motor vehicle structure comprising:
a frame component,
a powertrain component,
a resilient mounting assembly interposing said frame component and said powertrain component,
said resilient mounting assembly comprising a first cup member secured to one of said components, said first cup member having a wall portion and a base portion,
a second cup member telescopingly received within the first cup member, said second cup member having a wall portion and a base portion and being secured to the other of said components,
said second cup member opening toward the base portion of said first cup member with its wall portion spaced from the wall portion of said first cup member,
the wall portions of said first and second cup members being generally cylindrical and coaxial,
the wall portion of said second cup member having a radially outwardly flanged portion adjacent its free edge,
a first resilient member comprising an elastomeric column interposing the base portions of said first cup member and said second cup member and engaging the wall portion of said second cup member,
a second resilient member comprising an elastomeric annulus interposed between and having its inner and outer surfaces bonded to the wall portions of said first and second cup members, respectively,
said first resilient member including a first portion of a diameter substantially equal to the inside diameter of the cylindrical wall portion of the second cup member,
a second portion axially adjoining said first portion having a smaller diameter than said first portion,
a third portion axially adjoining said second portion having a generally conical shape the greatest diameter of which exceeds the diameter of said first portion, 2. Structure according to claim 1,
locating means protruding from the inside of the base portion of said first cup member,
a corresponding recess formed in an axial end of said first resilient member receiving said locating means.

3. Structure according to claim 1,
the flanged portion of said second cup member being axially engageable with the generally conical surface of said elastomeric column to prevent contact between the first and second cup members during severe axial compression of said mounting assembly.

4. Motor vehicle structure comprising:
a frame cross member,
a powertrain component having a predetermined axis,
a pair of resilient mounting assemblies interposing said cross member and said powertrain component, one of said mounting assemblies positioned on each side of said axis,
each of said resilient mounting assembly comprising a first cup member secured to said cross member, said first cup member having a wall portion and a base portion,
a second cup member telescopingly received within the first cup member, said second cup member having a wall portion and a base portion, said just-mentioned base portion being secured to said powertrain component,
said second cup member opening toward the base portion of said first cup member with its wall portion spaced from the wall portion of said first cup member,
the wall portions of said first and second cup members being generally cylindrical and coaxial,
the wall portion of said second cup member being radially outwardly flanged adjacent its free edge,
a first resilient member comprising an elastomeric column interposing the base portions of said first cup member and said second cup member and engaging the wall portion of said second cup member,
a second resilient member comprising an elastomeric annulus interposing and being bonded to the wall portions of said first and second cup members,
said first resilient member including a first portion of a diameter substantially equal to the inside diameter of the cylindrical wall portion of the second cup member,
a second portion axially adjoining said first portion having a smaller diameter than said first portion,
a third portion axially adjoining said second portion having a generally conical shape the greatest diameter of which exceeds the diameter of said first portion,
the axial height of said first resilient member exceeding the axial height of said second cup member,
the second portion of said first resilient member being axially positioned adjacent the flanged portion of the second cup member, and
the third portion of said first resilient member protruding from said second cup member when said mounting assembly is not under compression.

* * * * *